United States Patent
Lell et al.

(10) Patent No.: US 7,698,544 B2
(45) Date of Patent: Apr. 13, 2010

(54) AUTOMATIC HALTING OF A PROCESSOR IN DEBUG MODE DUE TO RESET

(75) Inventors: Anthony J. Lell, Katy, TX (US); Michael D. Asal, Austin, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 490 days.

(21) Appl. No.: 11/383,212

(22) Filed: May 14, 2006

(65) Prior Publication Data

US 2006/0259753 A1 Nov. 16, 2006

Related U.S. Application Data

(60) Provisional application No. 60/680,672, filed on May 13, 2005, provisional application No. 60/681,427, filed on May 16, 2005.

(51) Int. Cl.
*G06F 9/00* (2006.01)
*G06F 9/24* (2006.01)
*G06F 15/177* (2006.01)

(52) U.S. Cl. .......... 713/1; 713/2; 710/59; 710/260; 710/261; 710/267

(58) Field of Classification Search ............ 710/59.104, 710/260, 261, 267, 59; 713/1, 2
See application file for complete search history.

(56) References Cited

U.S. PATENT DOCUMENTS

| 5,748,873 | A  | * | 5/1998  | Ohguro et al. ............... 714/11  |
| 6,370,660 | B1 | * | 4/2002  | Mann ........................... 714/38 |
| 6,374,399 | B1 | * | 4/2002  | Mann ........................... 717/127 |
| 6,668,339 | B1 | * | 12/2003 | Maeda .......................... 714/38 |
| 6,820,192 | B2 | * | 11/2004 | Cho et al. ..................... 712/227 |
| 6,889,341 | B2 | * | 5/2005  | Collins et al. ................. 714/23 |
| 2004/0003322 | A1 | * | 1/2004 | Collins et al. ................. 714/27 |
| 2005/0216792 | A1 | * | 9/2005 | Tsuboi et al. .................. 714/38 |

* cited by examiner

*Primary Examiner*—Thomas Lee
*Assistant Examiner*—Jaweed A Abbaszadeh
(74) *Attorney, Agent, or Firm*—Robert D. Marshall, Jr.; W. James Brady; Frederick J. Telecky, Jr.

(57) ABSTRACT

Disclosed herein is a system and method of operating a processor before and after a reset has been asserted. Prior to a reset being asserted the processor operates in one of a plurality of states wherein primary code may be executed by the processor depending on said state. Upon a reset being asserted the processor begins executing code for a reset routine. The processor also executes a process such that the processor operates in the same state it was in prior to the reset upon the reset no longer being asserted.

18 Claims, 4 Drawing Sheets

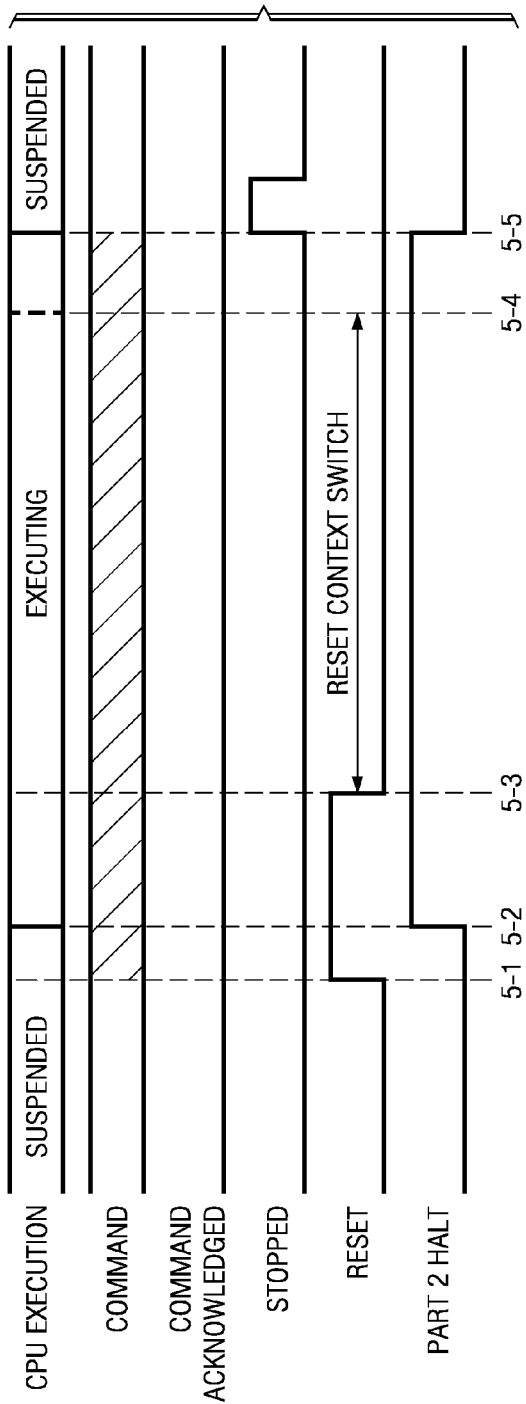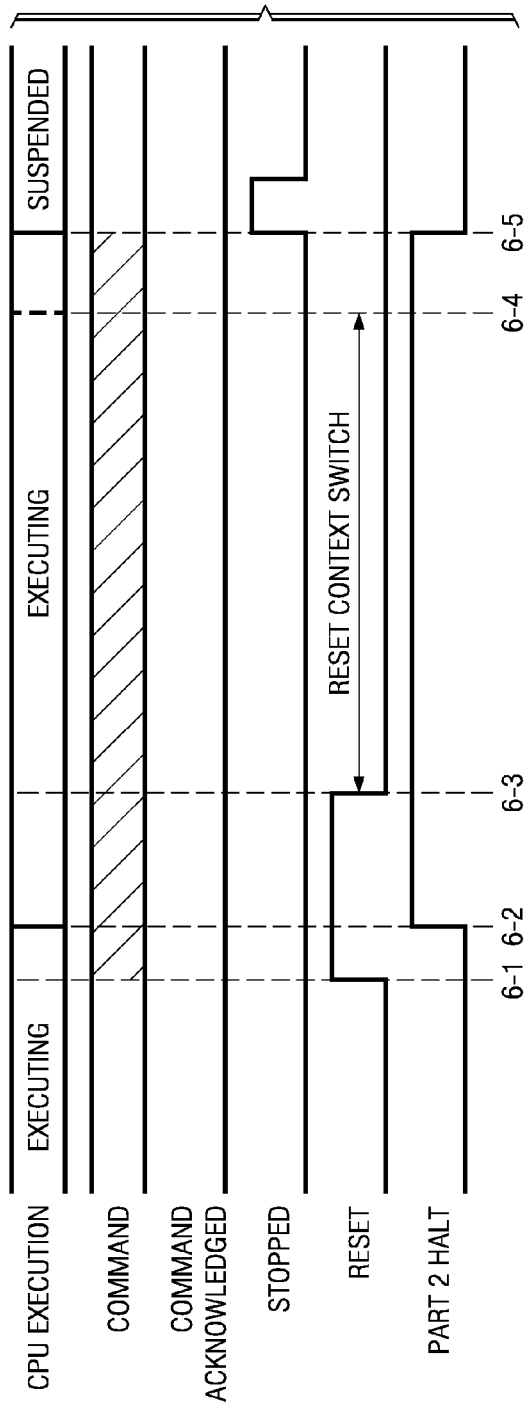

US 7,698,544 B2

AUTOMATIC HALTING OF A PROCESSOR IN DEBUG MODE DUE TO RESET

CROSS-REFERENCE TO RELATED APPLICATIONS

This application claims the benefit of U.S. Provisional Application Ser. No. 60/680,672, filed May 13, 2005, titled "Automatic Halting of a Processor in Debug Mode Due to Reset," and U.S. Provisional Application Ser. No. 60/681,427, filed May 16, 2005, titled "Debugging Software-Controlled Cache Coherence," both of which are incorporated by reference herein as if reproduced in full below.

BACKGROUND

According to Moore's Law, successive generations of integrated circuits with greater functionality and features may be available every eighteen months. This does not mean that the integrated circuits can be quickly incorporated into the latest electronic products. In fact, one major hurdle in bringing integrated circuits to market is ensuring that the integrated circuits, with their increased features and functionality, perform as desired through debugging. In the process of debugging the operation of an integrated circuit, it may be desirable to reset the central processing unit (CPU). For example, if a CPU is halted after a reset, then code may be loaded to initialize a memory or initialization scripts may be run before the CPU executes code again after a rest. Further, it may be desirable to reset the CPU while it is being debugged so as to ensure that the CPU executes as desired when a reset occurs.

SUMMARY

Disclosed herein is a system and method of operating a processor before and after a reset has been asserted. Prior to a reset being asserted the processor operates in one of a plurality of states wherein primary code may be executed by the processor depending on said state. Upon a reset being asserted the processor begins executing code for a reset routine. The processor also executes a process such that the processor operates in the same state it was in prior to the reset upon the reset no longer being asserted.

BRIEF DESCRIPTION OF THE DRAWINGS

For a detailed description of exemplary embodiments of the invention, reference will now be made to the accompanying drawings in which:

FIG. 5 depicts an example of when a reset is asserted while the CPU is in a suspended execution mode;

FIG. 6 depicts an example of the operation of the CPU when a reset is asserted when the CPU appears halted with primary code executing, or is expecting to halt.

DETAILED DESCRIPTION

Disclosed herein is a system and method for resetting a CPU and placing the CPU in the same state that it was in prior to being reset. This enables the CPU to be debugged through the use of breakpoints or other means of suspending the CPU without needing any user or software input for the CPU to proceed with what it was doing prior to the reset.

Figure 1:
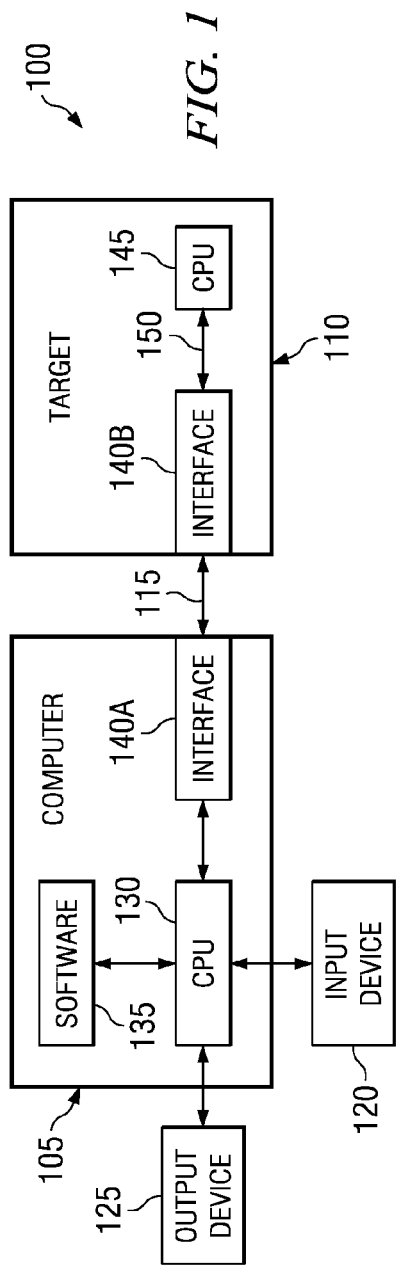
FIG. 1 depicts an example of a debugging system for executing code on a CPU and debugging the code based on the operation of the CPU.

FIG. 1 depicts an exemplary debugging system 100 including a host computer 105 coupled to a target device 110 through a connection 115. A user may debug the operation of the target device 110 by operating the host computer 105. The target device 110 may be debugged in order for the operation of the target device 110 to perform as desired (for example, in an optimal manner) with a central processing unit (CPU) 145. To this end, the host computer 105 may include an input device 120, such as a keyboard or mouse, as well as an output device 125, such as a monitor or printer. Both the input device 120 and the output device 125 couple to a central processing unit 130 (CPU) that is capable of receiving commands from a user and executing software 135 accordingly. Software 135 interacts with the target 110 and may allow the debugging of applications that are being executed on the target 110 by CPU 145.

Connection 115 couples the host computer 105 and the target device 110 and may be a wireless, hard-wired, or optical connection. Interfaces 140A and 140B may be used to interpret data from or communicate data to connection 115 respectively according to any suitable data communication method. Connection 150 provides outputs from the CPU 145 to interface 140B. As such, software 135 on host computer 105 communicates instructions to be implemented by CPU 145 through interfaces 140A and 140B across connection 115. The results of how CPU 145 implements the instructions is output through connection 150 and communicated back to host computer 105. These results are analyzed on host computer 105 and the instructions are modified so as to debug applications to be executed on target 110 by CPU 145.

The target 110 preferably includes the CPU 145 executing code that is actively being debugged and profiled. The code may be contained in a computer readable medium. In some embodiments, the target 110 may be a test fixture that accommodates the CPU 145 when code being executed by the CPU 145 is being debugged. The debugging may be completed prior to widespread deployment of the CPU 145. For example, if the circuitry 145 is eventually used in cell phones, then the executable code may be designed using the target 110.

The CPU 145 may include a single processor or multiple co-processors that will be implemented as part of an electronic device. For example, the CPU 145 may include multi-chip modules comprising multiple separate integrated circuits that are encapsulated within the same packaging. Regardless of whether the CPU 145 is implemented as a single-chip or multiple-chip module, the CPU 145 may eventually be incorporated into electronic devices such as cellular telephones, portable gaming consoles, network routing equipment, or other computers.

In order to debug code for execution by CPU 145, the code that is being debugged, or the primary code, is executed on the CPU 145. The state of the CPU 145 and the primary code is monitored by computer 105 in order to ensure that the code is being executed as desired. In order to facilitate this process, breakpoints may purposefully suspend execution of the primary code on the CPU 145. This enables a programmer using computer 105 to examine the state of the CPU 145 and the primary code at desired points in order to determine if the primary code is being executed as desired. Breakpoints may also be used to determine a precise point in the primary code where it stops executing as desired. When debugging primary code, a CPU 145 may be placed in a stop mode or a real-time mode. In a stop mode, if the CPU 145 reaches a breakpoint in the primary code then the CPU 145 will be placed in a suspended state during which the CPU 145 stops executing code. The CPU 145 will remain in the suspended state until the CPU 145 is reset. In a real-time mode, if the CPU 145 reaches a breakpoint in the primary code then the CPU 145 will be placed in a suspended state; however, the CPU 145 may continue executing primary code if certain interrupts are received.

After a reset has been asserted, the CPU 145 automatically begins running in an executing state to execute a reset context switch. The reset context switch is the process of aligning resources of the CPU 145 such that the reset routine may be accomplished Once the reset context switch is finished, the CPU 145 proceeds with executing the reset routine. Based on the state of the CPU 145 immediately prior to when the reset was applied, the CPU 145 may automatically issue a "part 2" halt command when the reset is asserted. A part 2 halt command is a command that instructs the CPU 145 to continue executing the current operation and halt at the next interruptible portion of code. An interruptible portion of code is a portion of primary code that has been designated to accept interrupts. Halting only at an interruptible portion of code ensures that some portions of code are not terminated prematurely.

In accordance with a preferred embodiment, a part 2 halt command is automatically asserted by the CPU 145 if at least one of the following four conditions is true when a reset is asserted. The first condition is when the CPU 145 is already in a suspended state immediately prior to the application of a reset. The second condition is when the CPU 145 is in a suspended state but began executing primary code as a result of an interrupt that caused the primary code to continue to be executed after a breakpoint. The third condition is when the CPU 145 is in a suspended state, but began executing primary code as a result of a command, the completion of which causes the CPU 145 to return to the suspended state. The fourth condition is when the second part of a two-part halt command is still pending immediately prior to when the reset was applied. For example, if a part 2 halt is pending when the reset was applied. As such, a part 2 halt command is automatically asserted by the CPU 145 when a reset is asserted if the CPU 145 is halted, appears halted with primary code executing, or is expecting to halt.

The following table details whether or not a part 2 halt command will be asserted by the CPU 145:

TABLE 1

| Case | CPU State At Reset | Part 2 Halt Command Pending? | CPU Asserts Part 2 Halt Command? | Resulting Code Execution |
|---|---|---|---|---|
| 1 | Suspended | X | Yes | Halt after the reset context switch or at the first interruptible boundary. |
| 2 | X | Yes | Yes | Same as above |
| 3 | Executing Primary Code | No | No | CPU runs code after reset. |

Note that each "X" in above table represents that any value may exist. In the first case the CPU 145 is already in a suspended state when the reset is asserted, and as such the CPU 145 asserts a part 2 halt command to halt the CPU 145 at the first interruptible boundary in the primary code. An interruptible boundary in the primary code is a point at which the primary code is designated as being able to accept interrupts. In the second case, a part 2 halt command is already pending when the reset is asserted. Therefore, the CPU 145 does not need to generate a new part 2 halt command, but may simply leave the pending part 2 halt command asserted. In the third case, the CPU 145 is executing primary code when the reset is asserted, therefore a part 2 halt command is not asserted, but rather the CPU 145 continues running the primary code after the reset. As such, the CPU 145 continues operating in whatever state it was in prior to receiving a reset Upon a reset being asserted, the acceptance of new commands is prevented. This creates two distinct regions of command processing relative to a reset. A pending command is either accepted prior to or coincident with a reset, or it is reissued after the reset. The latter case also encompasses the case in which a new command is being written while the reset is held, during the reset context switch, or after the reset context switch but before the reset routine has finished executing.

There are three cases when a command is accepted before or coincident with the reset being asserted. The first case where a command is accepted is when a HALT command has been acknowledged and a stopped status is set before or coincident with the reset being asserted. A HALT command instructs the CPU 145 to be placed in a suspended state. This case of when a command is accepted before or coincident with the reset being asserted is the first case shown in table 1, where the CPU 145 is suspended when a reset is asserted. In this case a part 2 halt command is automatically asserted by the CPU 145 as shown in FIG. 2 so as to ensure that the state of the CPU 145 returns to a suspended state after the reset is executed.

Figure 2:
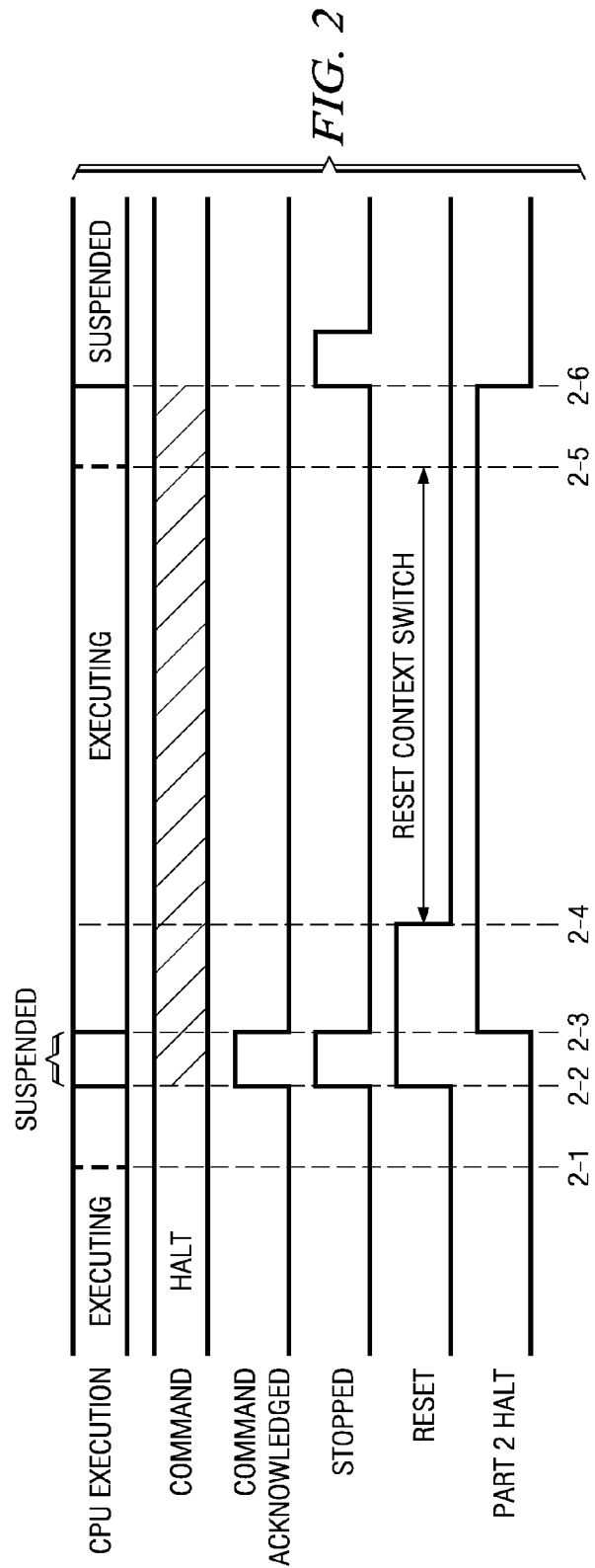
FIG. 2 depicts an example of the operation of a CPU when a HALT command is acknowledged coincident with the assertion of a reset.

FIG. 2 depicts an example of when a HALT command is acknowledged coincident with the assertion of a reset. In FIG. 2 the CPU 145 is executing when a HALT command is issued. At time 2-1 the CPU 145 begins the process of placing the CPU 145 in a suspended state as a result of the HALT command. At time 2-2 a reset is asserted at the same time the CPU 145 acknowledges the HALT command. As a result of the HALT command the CPU 145 is stopped and placed in a suspended state. Note that the Command area in FIG. 2 is shaded out for the duration of the reset process since no new commands will be acknowledged. At time 2-3 a part 2 halt is automatically asserted by the CPU as a result of a reset being asserted coincident with the CPU being placed in a suspended state. Further, at time 2-3 the CPU begins executing a reset context switch as a result of the reset being asserted. Between times 2-4 and 2-5 the reset remains asserted until the reset context switch is complete. At time 2-5 the reset context switch has completed and the first instruction of the reset routine is determined to be an interruptible portion of code. Therefore, the CPU 145 begins the process of placing the CPU 145 in a suspended state as a result of the part 2 halt command. At time 2-6 the CPU 145 is stopped and placed in a suspended execution state and the part 2 halt command is deasserted. At this point the CPU 145 may receive new commands. As such, since the CPU 145 was placed in a suspended state coincident with a reset being asserted, then the CPU 145 was placed in a suspended state again at the first interruptible portion of code.

The second case of when a command is accepted before or coincident with the reset being asserted is with a STEP or RUN1 command, where the stopped status of the CPU 145 has not been set before or coincident with the reset assertion. A STEP command is a command for skipping the next instruction in the primary code and then halting through the assertion of a part 2 halt, where interrupts are not allowed A RUN1 command is a command for skipping the next instruction in the primary code and then halting through the assertion of a part 2 halt, where interrupts are allowed. This case of when a command is accepted before or coincident with the reset being asserted is the second case of table 1, where a part 2 halt is currently pending, for example as a result of a STEP or RUN1 command, when a reset is asserted. As such, the part 2 halt remains pending when the reset is asserted. An example of the operation of the CPU 145 in this case is illustrated in FIG. 3.

Figure 3:
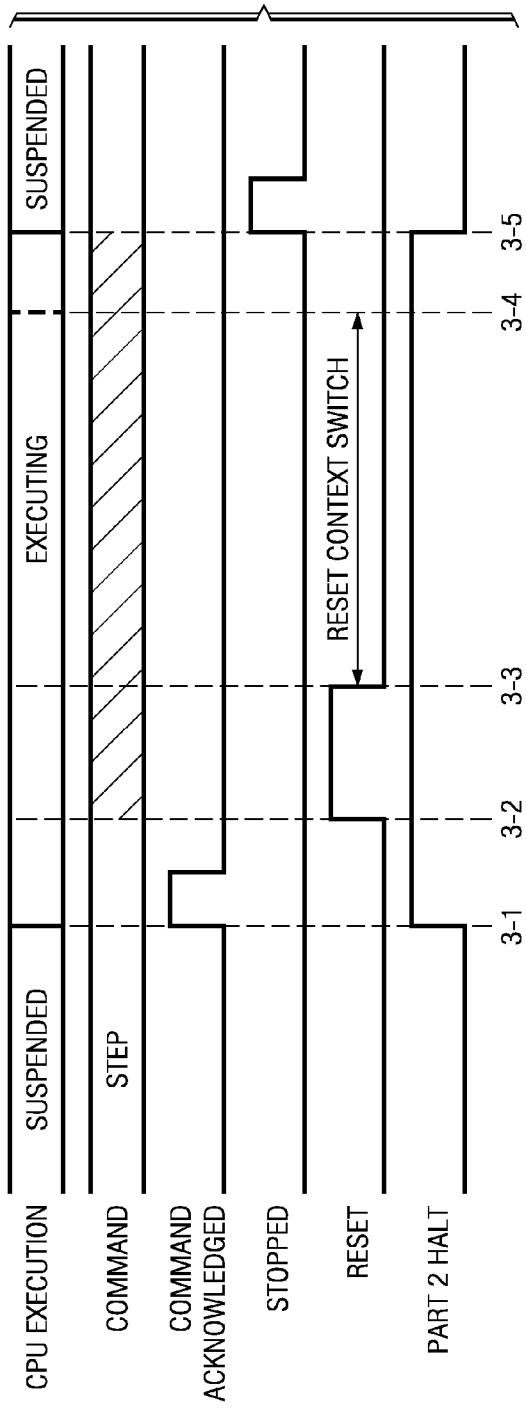
FIG. 3 depicts an example of the operation of a CPU when a reset is asserted prior to a STEP command being acknowledged and a part 2 halt associated with the STEP command causing the CPU to be placed in a stopped status.

FIG. 3 depicts an example of the operation of a CPU 145 when a reset is asserted prior to a STEP command being acknowledged and a part 2 halt associated with the STEP command causing the CPU 145 to be placed in a stopped status. In FIG. 3 the CPU 145 is suspended when a STEP command is issued. At time 3-1 the STEP command is acknowledged and a part 2 halt is asserted so as to halt the CPU 145 again at the completion of skipping the next primary code instruction. Between time 3-1 and 3-2 the process of skipping the next instruction is being implemented, but it is not completed so the part 2 halt cannot stop the CPU 145. At step 3-2 a reset is asserted prior to the part 2 halt placing the CPU 145 in a stopped status. Since a part 2 halt had already been asserted as a result of the STEP command, the part 2 halt remains asserted due to the reset. Further, at time 3-2 the CPU 145 begins executing a reset context switch as a result of the reset being asserted. Note that the Command area of FIG. 3 is shaded out for the duration of the reset process since no new commands will be acknowledged. Between times 3-3 and 3-4 the reset remains asserted until the reset context switch is complete. At time 3-4 the reset context switch has completed and the first instruction of the reset routine is determined to be an interruptible portion of code. As a result, the CPU 145 begins the process of being placed in a suspended state as a result of the part 2 halt command. At time 3-5 the CPU 145 is stopped and placed in a suspended execution state and the part 2 halt command is deasserted. At this point the CPU 145 may receive new commands. As such, since the CPU 145 was executing a command from the suspended state that was going to return the CPU 145 to the suspended state, then the CPU 145 was placed in a suspended state again at the first interruptible portion of code after receiving the reset.

The third case of when a command is accepted before or coincident with the reset being asserted is with a FRUN or RUN command and there is no intervening debug event causing suspension of code execution. One example of a type of debug event that may cause the suspension of code execution is a breakpoint. The FRUN command instructs the CPU 145 to execute the primary code, but debug events are ignored. The RUN command instructs the CPU 145 to execute the primary code, and debug events are acknowledged. This case of when a command is accepted before or coincident with the reset being asserted is the third case of table 1, where primary code is currently being executed and no part 2 halt is inserted. An example of the operation of the CPU 145 in this case is illustrated in FIG. 4.

Figure 4:
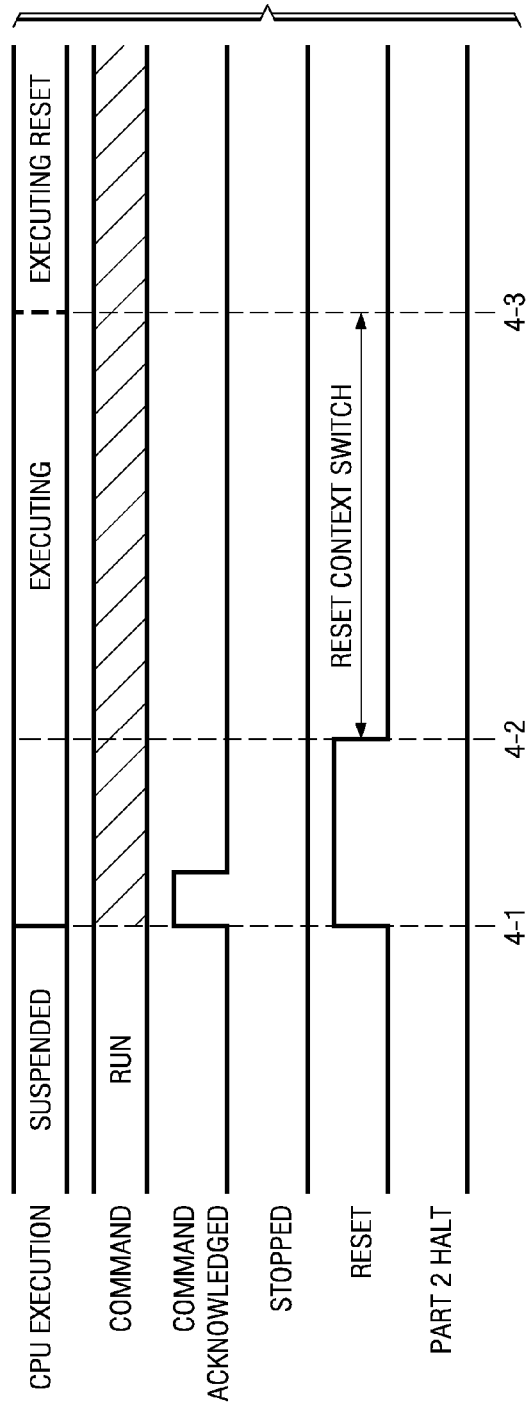
FIG. 4 depicts an example of the operation of a CPU when a RUN command has been acknowledged prior to or coincident with a reset.

FIG. 4 depicts an example of when a RUN command has been acknowledged prior to or coincident with a reset. In FIG. 4 the CPU 145 is suspended when a RUN command is issued. At time 4-1 the RUN command is acknowledged coincident with the reset being asserted. Further, at time 4-1 the CPU 145 begins executing a reset context switch as a result of the reset being asserted. Note that the Command area of FIG. 4 is shaded out for the duration of the reset process since no new commands will be acknowledged. Between times 4-2 and 4-3 the reset remains asserted until the reset context switch is complete. Since the RUN command was acknowledged coincident with the reset, no part 2 halt is asserted. Therefore, at the end of the reset context switch at time 4-3 the CPU 145 begins executing the reset routine. Upon completion of the reset routine the CPU 145 may continue running the primary code. As such, since the CPU 145 was placed in an executing state by the RUN command coincident with a reset being asserted, then the CPU 145 remains in the executing state after the reset.

The above three examples illustrate the operation of the CPU 145 when certain commands are received prior to or coincident with a reset. FIG. 5 illustrates an example of the operation of the CPU 145 if the reset is applied when the CPU 145 is currently suspended and no commands are acknowledged prior to or coincident with a reset.

FIG. 5 depicts an example of when a reset is asserted while the CPU 145 is in a suspended execution mode. In FIG. 5 the CPU 145 is suspended when a reset is asserted at time 5-1. Note that the Command area of FIG. 5 is shaded out for the duration of the reset process since no new commands will be acknowledged. At time 5-2 the CPU 145 acknowledges the reset and asserts a part 2 halt since the reset was asserted while the CPU 145 was suspended. Further, at time 5-2 the CPU 145 begins executing the reset context switch as a result of the reset being asserted. Between times 5-3 and 5-4 the reset remains asserted until the reset context switch is complete. At time 5-4 the reset context switch has completed and the first instruction of the reset routine is determined to be an interruptible portion of code. As a result, the CPU 145 begins the process of placing the CPU 145 in a suspended state as a result of the part 2 halt command. At time 5-5 the CPU is stopped and placed in a suspended execution state and the part 2 halt command is deasserted. At this point the CPU 145 may receive new commands. As such, since the CPU 145 was in a suspended state when a reset was asserted, then the CPU 145 was placed in a suspended state again at the first interruptible portion of code.

FIG. 6 depicts an example of the operation of the CPU 145 when a reset is asserted while the CPU 145 is executing in either the second or third condition for a part 2 halt command to automatically be asserted by the CPU 145. Again, the second condition is when the CPU 145 was in a suspended state but began executing primary code as a result of an interrupt. The third condition is when the CPU 145 was in a suspended state but began executing primary code as a result of a command, for example the STEP command, wherein upon completion of executing the command the CPU 145 will return to the suspended state. When a reset is asserted while the CPU 145 is in one of those two conditions, the CPU 145 recognizes that a part 2 halt command needs to be asserted. In FIG. 6 the CPU is executing in either the second or third condition for a part 2 halt command to automatically be asserted by the CPU 145 when a reset is asserted at time 5-1. Note that the Command area of FIG. 6 is shaded out for the duration of the reset process since no new commands will be acknowledged. At time 6-2 the CPU 145 acknowledges the reset and asserts a part 2 halt as a result of the reset being asserted while the CPU 145 was in either the second or third condition. Further, at time 6-2 the CPU 145 begins executing the reset context switch as a result of the reset being asserted. Between times 6-3 and 6-4 the reset remains asserted until the reset context switch is complete. At time 6-4 the reset context switch has completed and the first instruction of the reset routine is determined to be an interruptible portion of code. The CPU then begins the process of placing the CPU 145 in a suspended state as a result of the part 2 halt command. At time 6-5 the CPU is stopped and placed in a suspended execution state and the part 2 halt command is deasserted. At this point the CPU 145 may receive new commands. As such, since the CPU 145 was placed in either the second or third condition for a part 2 halt command to automatically be asserted by the CPU 145 when a reset was asserted, then the CPU 145 was placed in a suspended state at the first interruptible portion of code.

Figure 7:
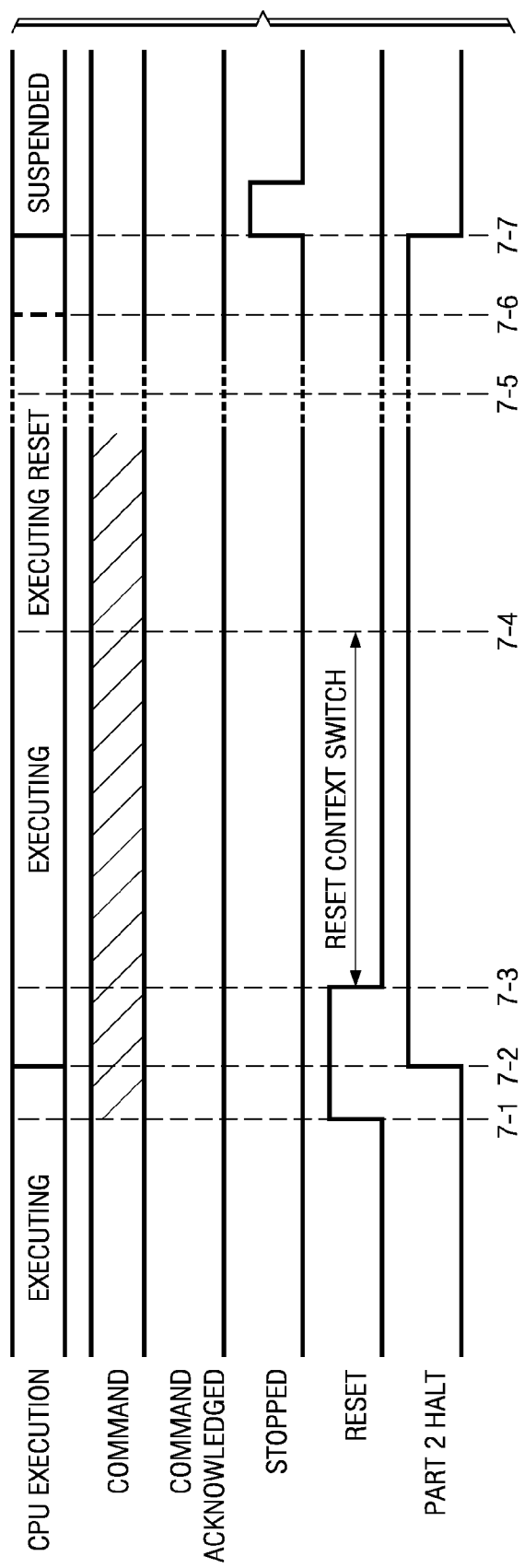
FIG. 7 depicts an example of the operation of the CPU when a reset is asserted and a corresponding part 2 halt remains pending until and interruptible portion of code.

The above examples with a part 2 halt being executed at the end of the reset context switch have all assumed that the CPU 145 had reached an interruptible portion of code. A modified version of the example in FIG. 6 assuming that the reset routine is uninterruptible code is shown in FIG. 7. In the example shown in FIG. 7 the part 2 halt remains pending after the code execution for the reset routine begins and remains pending until an interruptible boundary is located. When an interruptible portion of code is located, the CPU 145 is suspended.

In FIG. 7 the CPU 145 is executing in either the second or third condition for a part 2 halt command to automatically be asserted by the CPU 145 when a reset is asserted at time 6-1. Note that the Command area of FIG. 7 is shaded out for the duration of the reset process since no new commands will be acknowledged. At time 7-2 the CPU 145 acknowledges the reset and asserts a part 2 halt as a result of the reset being asserted while the CPU 145 was in either the second or third condition. Further, at time 7-2 the CPU 145 begins executing the reset context switch as a result of the reset being asserted. Between times 7-3 and 7-4 the reset remains asserted until the reset context switch is complete. At time 7-4 the reset context switch has completed, however the CPU 145 determines that an interruptible portion of code has not been reached. As a result the part 2 halt remains pending until the next interruptible boundary in the code. At time 7-5 is a representation of an unspecified elapsed amount of time where the CPU 145 continues executing uninterruptible code and the part 2 halt remains pending. At time 7-6 the CPU 145 determines that an interruptible portion of the code has been reached. As a result, the CPU 145 begins the process of placing the CPU 145 in a suspended state as a result of the part 2 halt command. At time 7-7 the CPU 145 is stopped and placed in a suspended execution state and the part 2 halt command is deasserted. At this point the CPU 145 may receive new commands. As such, since the CPU 145 was in either the second or third condition for a part 2 halt command to automatically be asserted by the CPU 145 when a reset was asserted, then the CPU 145 was placed in a suspended state at the first interruptible portion of code. It is noted that the part 2 halt may be terminated prior to finding an interruptible boundary if another debug event occurs, such as a breakpoint, which causes execution of the CPU 145 to be suspended.

Disclosed above is a system and method for resetting a CPU and placing the CPU in the same state that it was in prior to being reset. This enables the CPU to be debugged through the use of breakpoints or other means of suspending the CPU without needing any user or software input for the CPU to proceed with what it was doing prior to the reset.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A method of data processor operation, comprising:
   receiving a reset at the data processor; and
   in response to reception of said reset, but only if a predetermined condition exists in the data processor, causing the data processor automatically to continue execution of code and to halt said execution at a next interruptible portion of the code.

2. The method of claim 1, wherein said predetermined condition is a suspended execution state of the data processor.

3. The method of claim 1, wherein said predetermined condition is an executing state of the data processor that started from a suspended execution state of the data processor as a result of an interrupt.

4. The method of claim 1, wherein said predetermined condition is an executing state of the data processor that started as a result of a command and will transition to a suspended execution state of the data processor upon completion of the command.

5. The method of claim 1, further comprising receiving a command at the data processor prior to or coincident with said reception of said reset.

6. The method of claim 5, wherein said predetermined condition is said command instructing the data processor to be placed in a suspended execution state.

7. A computer readable storage medium having stored thereon computer instructions which, when executed by a data processor, cause the data processor to:
   receive a reset to the data processor; and
   in response to reception of said reset, but only if a predetermined condition exists in the data processor, automatically continue execution of code and halt said execution at a next interruptible portion of the code.

8. The medium of claim 7, wherein said predetermined condition is a suspended execution state of the data processor.

9. The medium of claim 7, wherein said predetermined condition is an executing state of the data processor that started from a suspended execution state of the data processor as a result of an interrupt.

10. The medium of claim 7, wherein said predetermined condition is an executing state of the data processor that started as a result of a command and will transition to a suspended execution state of the data processor upon completion of the command.

11. The medium of claim 7, wherein said computer instructions, when executed by the data processor, cause the data processor to receive a command prior to or coincident with said reception of said reset.

12. The medium of claim 11, wherein said predetermined condition is said command instructing the data processor to be placed in a suspended execution state.

13. A data processing apparatus, comprising:
    an input for receiving a reset; and
    a data processor coupled to said input and configured for responding to reception of said reset by automatically continuing execution of code and halting said execution at a next interruptible portion of the code, but only if a predetermined condition exists in said data processor.

14. The apparatus of claim 13, wherein said predetermined condition is a suspended execution state of said data processor.

15. The apparatus of claim 13, wherein said predetermined condition is an executing state of said data processor that started from a suspended execution state of said data processor as a result of an interrupt.

16. The apparatus of claim 13, wherein said predetermined condition is an executing state of said data processor that started as a result of a command and will transition to a suspended execution state of said data processor upon completion of the command.

17. The apparatus of claim 13, wherein said data processor is configured to receive a command prior to or coincident with said reception of said reset.

18. The apparatus of claim 17, wherein said predetermined condition is said command instructing said data processor to be placed in a suspended execution state.

* * * * *